US011290369B2

(12) United States Patent
Ceccarelli et al.

(10) Patent No.: US 11,290,369 B2
(45) Date of Patent: Mar. 29, 2022

(54) METHODS IN A TELECOMMUNICATIONS NETWORK

(71) Applicant: Telefonaktiebolaget LM Ericsson (publ), Stockholm (SE)

(72) Inventors: Daniele Ceccarelli, Sollentuna (SE); Tobias Ley, Taby (SE); Massimiliano Maggiari, Pleasanton, CA (US)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 16/770,054

(22) PCT Filed: Dec. 13, 2017

(86) PCT No.: PCT/EP2017/082711
§ 371 (c)(1),
(2) Date: Jun. 4, 2020

(87) PCT Pub. No.: WO2019/114959
PCT Pub. Date: Jun. 20, 2019

(65) Prior Publication Data
US 2021/0211371 A1    Jul. 8, 2021

(51) Int. Cl.
*H04L 12/751* (2013.01)
*H04L 45/00* (2022.01)
*G06K 9/62* (2022.01)
*H04L 45/12* (2022.01)
(Continued)

(52) U.S. Cl.
CPC .......... *H04L 45/08* (2013.01); *G06K 9/6262* (2013.01); *H04L 45/123* (2013.01); *H04L 45/70* (2013.01); *H04L 47/39* (2013.01); *H04L 47/627* (2013.01)

(58) Field of Classification Search
CPC ....... H04L 45/08; H04L 45/70; H04L 45/123; H04L 47/39; H04L 47/627; G06K 9/6262
See application file for complete search history.

(56) References Cited

U.S. PATENT DOCUMENTS

| 2013/0031036 A1* | 1/2013 | Kojima | ................. G06N 20/00 706/12 |
| 2015/0195126 A1* | 7/2015 | Vasseur | ................. H04L 45/02 370/218 |

(Continued)

FOREIGN PATENT DOCUMENTS

WO    2016082859 A1    6/2016

OTHER PUBLICATIONS

PCT International Search Report, dated Feb. 14, 2018, in connection with International Application No. PCT/EP2017/082711, all pages.

(Continued)

*Primary Examiner* — Brian P Cox
(74) *Attorney, Agent, or Firm* — Leffler Intellectual Property Law, PLLC

(57) ABSTRACT

A method in a telecommunications network comprises acquiring values of one or more parameters relating to traffic flow between a first group of nodes in the network. The method further comprises using a first reinforcement learning agent to dynamically adjust a first routing metric used to route traffic through the first group of nodes, based on the values of the one or more parameters, so as to alter the traffic flow through the first group of nodes.

24 Claims, 12 Drawing Sheets

(51) Int. Cl.
    *H04L 47/10*     (2022.01)
    *H04L 47/625*    (2022.01)

(56) References Cited

U.S. PATENT DOCUMENTS

2017/0105163 A1* 4/2017 Hu .......................... G06N 3/006
2018/0376390 A1* 12/2018 Gemelos ........... H04W 36/0005

OTHER PUBLICATIONS

PCT Written Opinion, dated Feb. 14, 2018, in connection with International Application No. PCT/EP2017/082711, all pages.
Nel Edwill et al., "Machine Learning Algorithms for Packet Routing in Telecommunication Networks", Date Unknown, 2 pages.
Amaral Pedro et al., "SDN based Traffic Engineering without Optimization: a Centrality based Approach", IEEE ICC 2017 SAC Symposium SDN & NFV Track, May 21, 2017, pp. 1-7.

* cited by examiner

METHODS IN A TELECOMMUNICATIONS NETWORK

TECHNICAL FIELD

Embodiments herein relate to methods in a telecommunications network. More particularly but non-exclusively, embodiments herein relate to the use of reinforcement learning agents in a telecommunications network.

BACKGROUND

This disclosure generally relates to managing the flow of traffic (e.g. steering of traffic) through a telecommunications network. Current traffic steering methods may be split into two main categories: Traffic Engineered and Non-Traffic engineered solutions.

Traffic Engineered solutions comprise forcing traffic to follow preferred paths (e.g. the path with minimal delay or administrative constraints) and policy based recovery of the traffic (e.g. if event X happens then move the traffic to an alternate path). Traffic Engineered solutions are often used for premium traffic, as they allow traffic to be sent through particular nodes of the network (e.g. the most reliable or fastest links).

Non-Traffic Engineered solutions are common at layers 2 and 3 and involve injecting traffic into the telecommunications network, after which, the traffic is routed (e.g. forwarded) by each node accordingly to the shortest path through the network. Routing decisions are taken node by node in the so called "per hop behavior". For example, each link between each pair of nodes in the telecommunications network may be associated with a routing metric (such as an administrative link cost). A node may calculate the shortest path through the network to a destination node based on the cumulative routing metric associated with the summation of the routing metric values of the links between it and the destination node.

Traffic Engineered networks may be complex to operate, as they require configuration of policies, configuration of protocols, and a stateful path computation element (PCE) to perform complex computation algorithms. In some cases, therefore, only a portion of the traffic is engineered while the rest is routed on a per hop behavior basis.

Non-Traffic Engineered networks on the other hand are very common as they are relatively simple to operate and do not require any particular configuration.

SUMMARY

As noted above, although there are advantages to the use of non-traffic engineered networks, they also suffer from various disadvantages. Non-traffic engineered networks may lack predictability as the amount of traffic flowing through them can increase or decrease at any time, with new traffic sources appearing at any time. There may therefore be a need to over provision network resources in order for the network to be able to cope with high load on particular paths/network resources. More generally, non-traffic engineered networks may have traffic imbalances with heavily loaded portions of the network as well as parts with very low resource usage. It is an objective of this disclosure to improve upon these issues.

Therefore, according to a first aspect, there is provided a method in a telecommunications network. The method comprises acquiring values of one or more parameters relating to traffic flow between a first group of nodes in the network. The method comprises using a first reinforcement learning agent to dynamically adjust a first routing metric used to route traffic through the first group of nodes, based on the values of the one or more parameters, so as to alter the traffic flow through the first group of nodes.

The use of reinforcement learning agents, as described in the methods herein, allows traffic to be dynamically routed away from congestion situations. This applies to those networks where the traffic cannot be bounded to a given label switched path. Generally, in Traffic Engineered networks it is possible to force the traffic to go through a path, while in non-Traffic Engineered networks, it is not possible to direct traffic in this way. The solutions herein make it possible to direct traffic to particular resources (e.g. away from over-loaded parts of the network, for example). In this way, some of the advantages of Traffic Engineering networks can be brought to Non-Traffic Engineered networks.

According to a second aspect there is provided a node in a telecommunications network. The node is configured to acquire values of one or more parameters relating to traffic flow between a first group of nodes in the network. The node is configured to use a first reinforcement learning agent to dynamically adjust a first routing metric used to route traffic through the first group of nodes, based on the values of the one or more parameters, so as to alter the traffic flow through the first group of nodes.

According to a third aspect there is provided a computer program comprising instructions which, when executed on at least one processor, cause the at least one processor to carry out any one of the methods described herein.

According to a fourth aspect there is provided a computer program product comprising a computer-readable medium with a computer program as described herein.

DESCRIPTION OF EMBODIMENTS

As noted above, non-traffic engineered networks may lack predictability. There may also be a need to heavily over provision network resources in order for the network to be able to cope with high load on particular paths/network resources. This may lead to heavily loaded portions of the networks as well as parts with very low resource usage.

Figure 1:
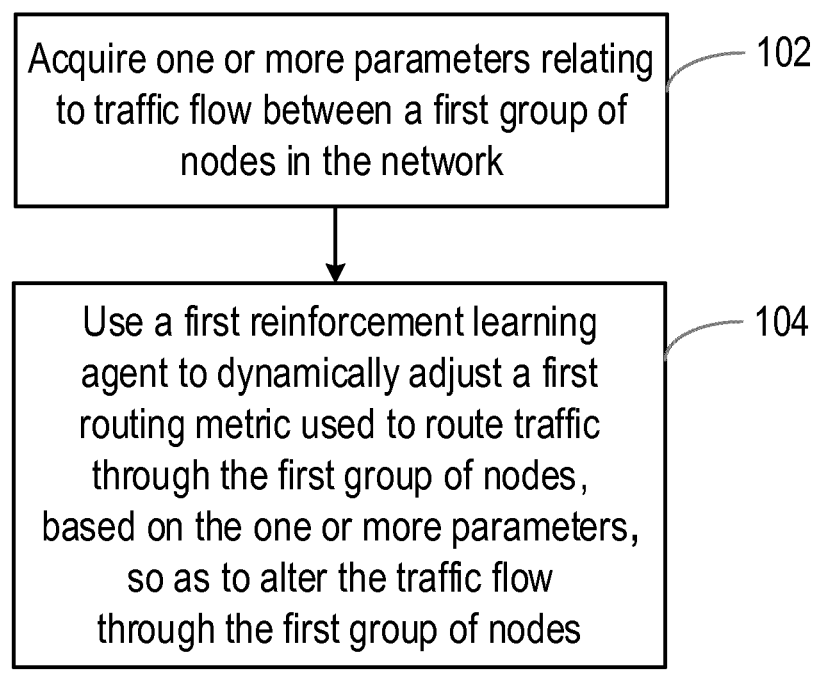
FIG. 1 shows an example method according to some embodiments.

FIG. 1 shows a method 100 in a telecommunications network. The method 100 comprises, in block 102, acquiring values of one or more parameters relating to traffic flow between a first group of nodes in the network. In a block 104, the method comprises using a first reinforcement learning agent to dynamically adjust a first routing metric used to route traffic through the first group of nodes, based on the values of the one or more parameters, so as to alter the traffic flow through the first group of nodes.

The use of reinforcement learning agents in this way allows dynamic adjustment of traffic flows based on current network conditions. The reinforcement learning agent may adjust the first routing metric to produce a more even distribution of traffic, thus avoiding congestion and/or low resource usage scenarios. This may reduce the need to over provision network resources. More generally, dynamic traffic management may help to avoid overload situations and distribute load more optimally through the network, reducing average end-to-end travel times through the network and introducing dynamic load balancing.

The skilled person will be familiar with reinforcement learning and reinforcement learning agents, however, briefly, reinforcement learning is a type of machine learning process whereby a reinforcement learning agent (e.g. algorithm) is used to perform actions on a system to adjust the system according to an objective (which may, for example, comprise moving the system towards an optimal or preferred state of the system). The reinforcement learning agent receives a reward based on whether the action changes the system in compliance with the objective (e.g. towards the preferred state), or against the objective (e.g. further away from the preferred state). The reinforcement learning agent therefore adjusts parameters in the system with the goal of maximising the rewards received.

Put more formally, a reinforcement learning agent receives an observation from the environment in state S and selects an action to maximize the expected future reward r. Based on the expected future rewards, a value function V for each state can be calculated and an optimal policy u that maximizes the long term value function can be derived.

In the context of this disclosure, the telecommunications network is the "environment" in the state S. The "observations" are the values of the one or more parameters relating to traffic flow between the first group of nodes in the network and the "actions" performed by the reinforcement learning agents are the adjustments made by the reinforcement learning agent to the routing metrics used to route traffic through the first group of nodes in the telecommunications network. Generally, the reinforcement learning agents herein receive feedback in the form of a reward or credit assignment every time they perform an adjustment (e.g. action). As noted above, the goal of the reinforcement learning agents herein is to maximise the reward received.

Turning back to the method 100, in some embodiments, the telecommunications network comprises a software defined network (SDN). In some embodiments, the telecommunications network comprises a non-traffic engineered network, or non-traffic engineered software defined network. In some embodiments, the telecommunications network may comprise both traffic engineered and non-traffic engineered solutions. In such embodiments, the method 100 may be applied to portion(s) of the telecommunications network that are non-traffic engineered.

As noted above, traffic may be forwarded in non-traffic engineered networks according to routing metrics. For example, each link between each pair of nodes in the telecommunications network may be associated with a routing metric (such as an administrative link cost) which is advertised to all nodes in the network. A node may calculate the shortest path through the network to a destination node based on the cumulative routing metric associated with the summation of the routing metric values of the links between it and the destination node.

Generally, the telecommunications network may comprise any one, or any combination of: a wired link (e.g. ASDL) or a wireless link such as Global System for Mobile Communications (GSM), Wideband Code Division Multiple Access (WCDMA), Long Term Evolution (LTE), WiFi, or Bluetooth wireless technologies. The skilled person will appreciate that these are merely examples and that the telecommunications network may comprise other types of links.

Generally, a node comprises any component in the telecommunications network suitable for sending and/or receiving traffic (e.g. routing traffic) in the telecommunications network. For example, a node may comprise equipment capable, configured, arranged and/or operable to communicate directly or indirectly with a device (such as a wireless device of user equipment) and/or with other network nodes or equipment in the telecommunications network to enable and/or provide wireless or wired access to the device and/or to perform other functions (e.g., administration) in the telecommunications network. Examples of nodes include, but are not limited to, access points (APs) (e.g., radio access points), base stations (BSs) (e.g., radio base stations, Node Bs, evolved Node Bs (eNBs) and NR NodeBs (gNBs)).

Generally, the first group of nodes may comprise any two or more nodes that are in communication such that traffic may pass between them. The first group of nodes may comprise the same type of node or different types of nodes. The first group of nodes may comprise nodes of any combination or permutation of the types of nodes listed in the example list above.

As previously noted, traffic flows between the first group of nodes (e.g. between different pairs of nodes in the first group of nodes). The traffic may be any type of traffic, including, for example, data, voice, voice over IP (VoIP), short messaging service (SMS) messages or multi-media messaging service (MMS) messages.

With respect to method 100, block 102 of method 100 comprises acquiring values of one or more parameters relating to traffic flow between a first group of nodes in the network. In some embodiments, the one or more parameters may comprise an administrative cost of a link (e.g. connection) between two nodes in the first group of nodes. In some embodiments the one or more parameters may comprise a congestion, performance or telemetry indicator (or metric). Examples of congestion, performance indicators and telemetry indicators include packet throughput of a node, buffer or queue size of a node and a number of dropped packets on a link between two nodes. In some embodiments, the one or more parameters may comprise other measures describing the amount of traffic on a link between nodes. The skilled person will appreciate that these are merely examples however and that values of other parameters relating to traffic flow may also be acquired.

In some embodiments, the step of acquiring 102 may comprise measuring the one or more parameters relating to traffic flow between the first group of nodes. For example, measuring one or more parameters relating to traffic flow between one or more pairs of nodes in the first group of nodes. In some embodiments, the step of acquiring 102 may comprise receiving measurements of one or more parameters relating to traffic flow. For example, values (e.g. measurements) of the one or more parameters may be received from one or more nodes in the telecommunications network. In some embodiments, the values of the one or more parameters may be reported by one or more nodes in the first group of nodes.

In some embodiments, the values of the one or more parameters may be acquired periodically. For example, in some embodiments, acquiring 102 may comprise periodically collecting performance and/or telemetry metrics from the network in order to detect congestion/failure situations. Acquiring periodic measurements enables the first reinforcement learning agent to adjust the first routing metric (in step 104 as will be described below) based on real-time (or near real-time) information.

Turning now to step 104, in some embodiments, the first routing metric comprises any metric used by the telecommunications network to route traffic. For example, in some embodiments, the first routing metric comprises an administrative link cost between two nodes in the first group of nodes. Administrative link costs may be used by the network to judge the cost (which may be any cost-based metric, such as, for example, metrics based on congestion, bandwidth of a link, jitter on a link or monetary cost to an operator of using a particular link) of sending traffic across the link. Administrative link costs may be used in non-traffic engineered solutions, for example where traffic is routed on a per-hop basis (the administrative link cost may be a weighted number of hops, e.g. so as to make one link appear more costly as it comprises more "hops" than another).

Having the first reinforcement agent adjust an administrative link cost means that the methods herein do not necessarily require any software upgrades in the nodes in the first group of nodes (as traffic is already routed using administrative link costs) but rather just the deployment of the reinforcement learning agent in the network node that manages (e.g. sets) the values of the administrative link costs.

In some embodiments, the first reinforcement agent may operate according to one or more principles of a reinforcement learning concept and/or according to a related algorithm for policy optimization. A policy in this sense comprises a set of learnt rules or actions that the reinforcement learning agent has learnt produces a particular outcome. Examples of reinforcement learning concepts include, for example, policy-gradient, REINFORCE, DQN (Deep Q Network), TRPO (Trust Region Policy Optimization), A3S and proximal policy optimization (PPO).

The first reinforcement learning agent dynamically adjusts the first routing metric, based on the values of the one or more parameters so as to alter the traffic flow through the network. As will be familiar to the skilled person, the reinforcement learning agent may dynamically adjust the first routing metric periodically (e.g. at regular intervals) or in response to a change in conditions in the traffic flow through the first set of nodes (e.g. in response to detecting traffic congestion between first and second nodes or in response to detection of a possible congestion scenario developing between first and second nodes in the first group of nodes).

Figure 1A:
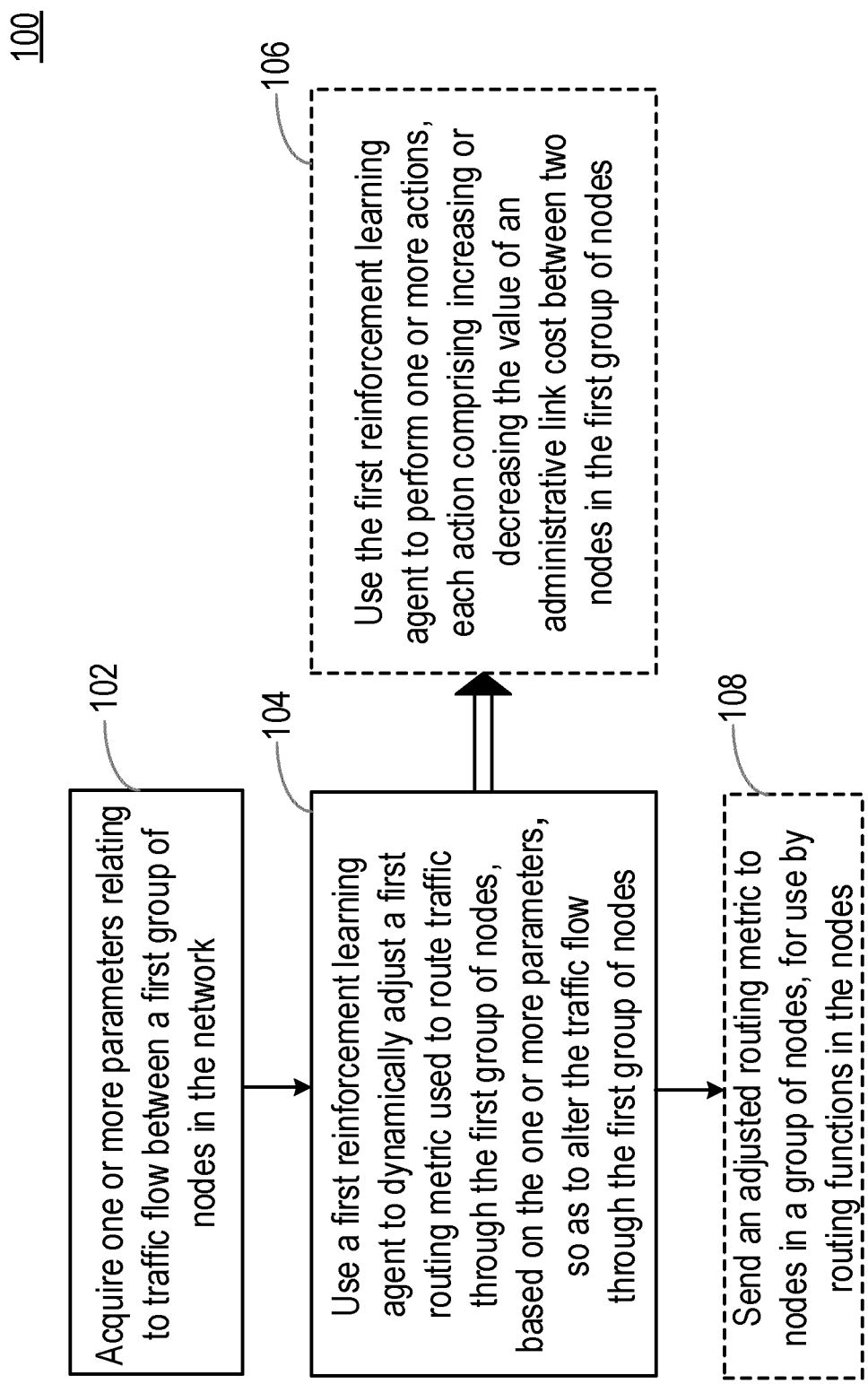
FIG. 1*a* shows a further example method according to some embodiments.

FIG. 1a shows a method according to some embodiments herein. As shown in FIG. 1a, in some embodiments, the step of using 104 comprises using 106 the first reinforcement learning agent to perform one or more actions, each action comprising increasing or decreasing the value of an administrative link between two nodes in the first group of nodes. This is illustrated in FIGS. 2 to 6 which illustrate the manner in which a first reinforcement agent may be used to dynamically adjust the first routing metric used to route traffic through the first group of nodes.

Figure 2:
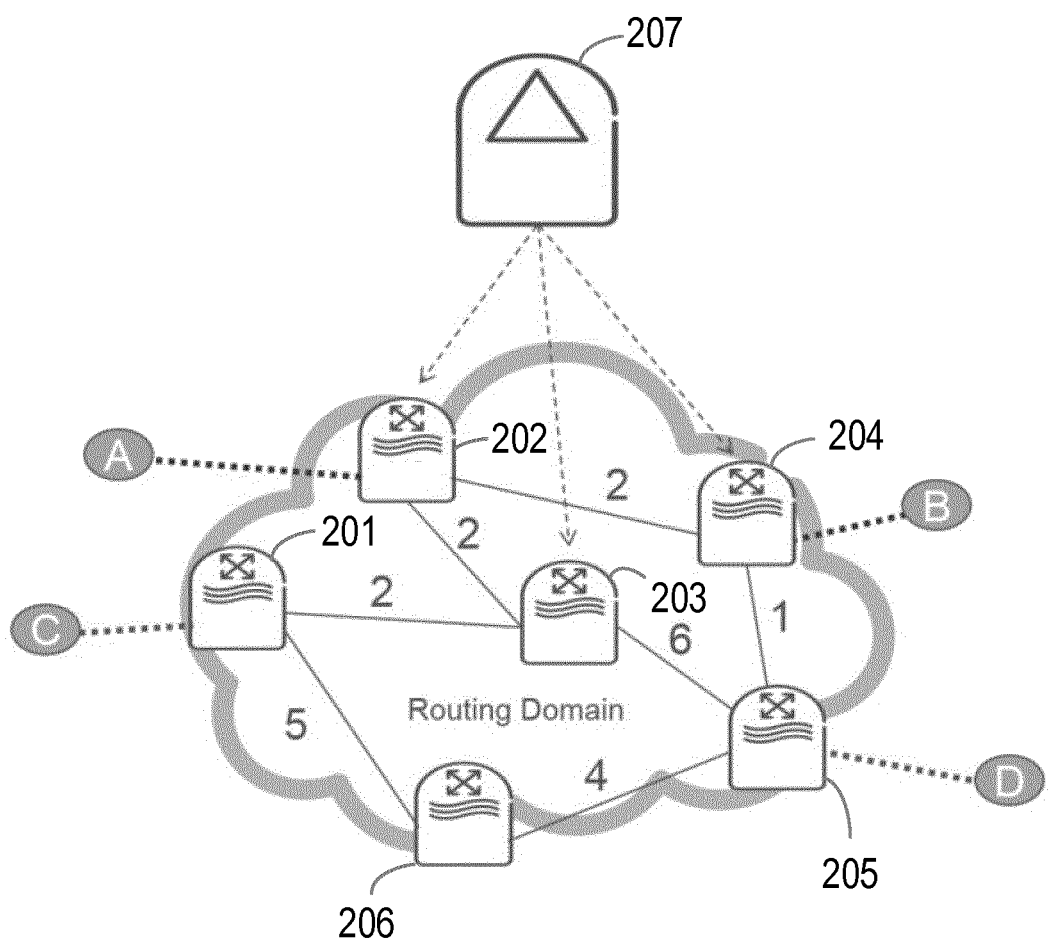
FIGS. 2-6 illustrate a manner in which a routing metric may be adjusted by a reinforcement learning agent according to an embodiment.

FIG. 2 shows a first group of nodes comprising nodes 201, 202, 203, 204, 205 and 206 in a telecommunications network. The first group of nodes is in communication with other nodes belonging to other groups of nodes (e.g. nodes not belonging to the first group of nodes) through links A, B, C and D which link nodes 202, 204, 201 and 205 to other nodes outside of the first group of nodes respectively. Each node in the first group of nodes is linked to another node in the network (as illustrated by the straight lines between the nodes) and each link is associated with an administrative link cost (indicated by the number beside each link). For example, it can be seen that node 202 is in communication with node 204 by means of a link with an administrative link cost of "2". FIG. 2 further shows a first reinforcement learning agent 207. The first reinforcement learning agent 207 is configured to acquire values of one or more parameters relating to traffic flow between a first group of nodes in the network, and dynamically adjust a first routing metric used to route traffic through the first group of nodes, based on the values of the one or more parameters, so as to alter the traffic flow through the first group of nodes.

Figure 3:
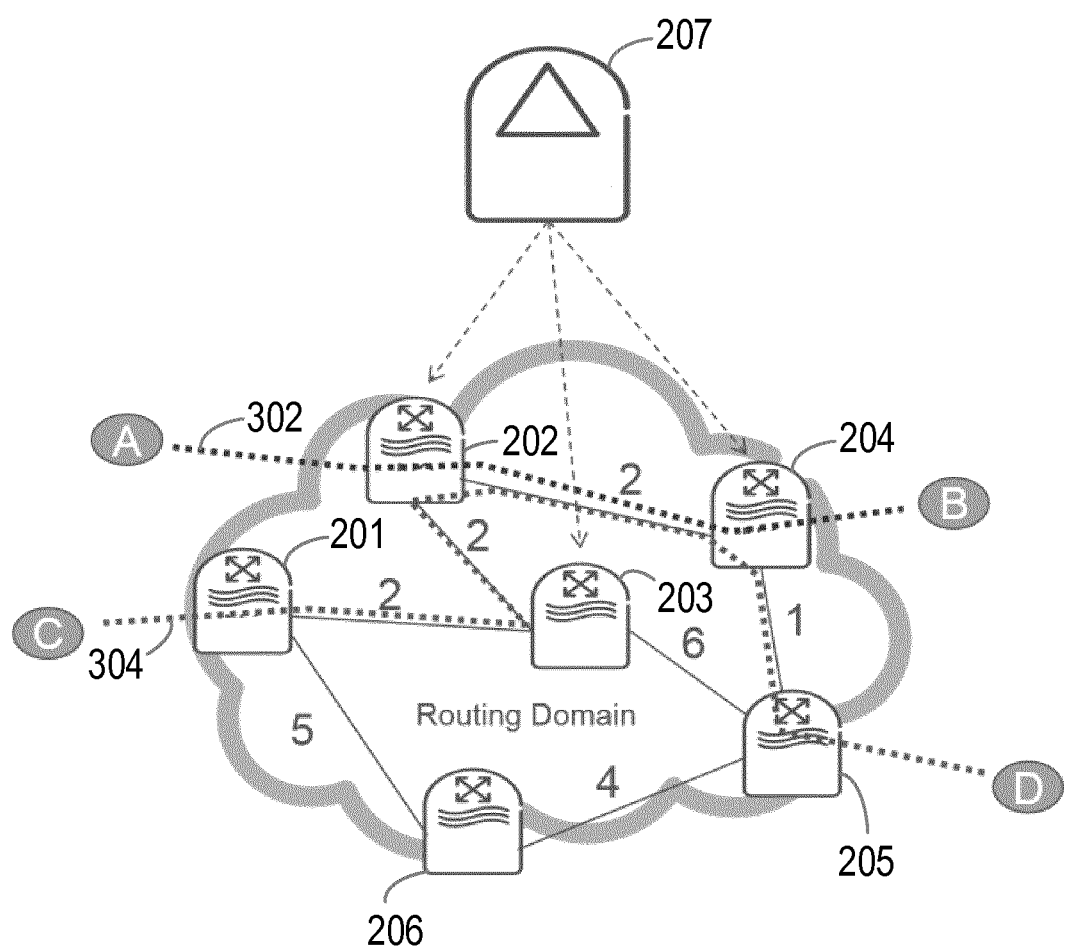

Turning now to FIG. 3, FIG. 3 shows the same first group of nodes and first reinforcement learning agent 207 as shown in FIG. 2. Traffic flowing through the first group of nodes is forwarded through the first group of nodes according to the lowest cost route (e.g. the path through the first group of nodes having the lowest cumulative administrative link cost). For example, as shown in FIG. 3, a stream of traffic 302 entering the first group of nodes at node 202 via link A and exiting the first group of nodes at point B will travel between nodes 202 and 204. A stream of traffic 304 entering the first group of nodes from point C to D will travel from C to D via the links having the lowest cumulative administrative link cost, which in this case comprises the route through nodes 201, 203, 202, 204 and 205. This may lead to a congestion situation between nodes 202 and 204 (and similarly underutilisation of the links between nodes 201 and 206 and between nodes 206 and 205) if, based on these administrative link costs, a large proportion of traffic flowing through the first group of nodes is directed through the link between nodes 202 and 204.

Figure 4:
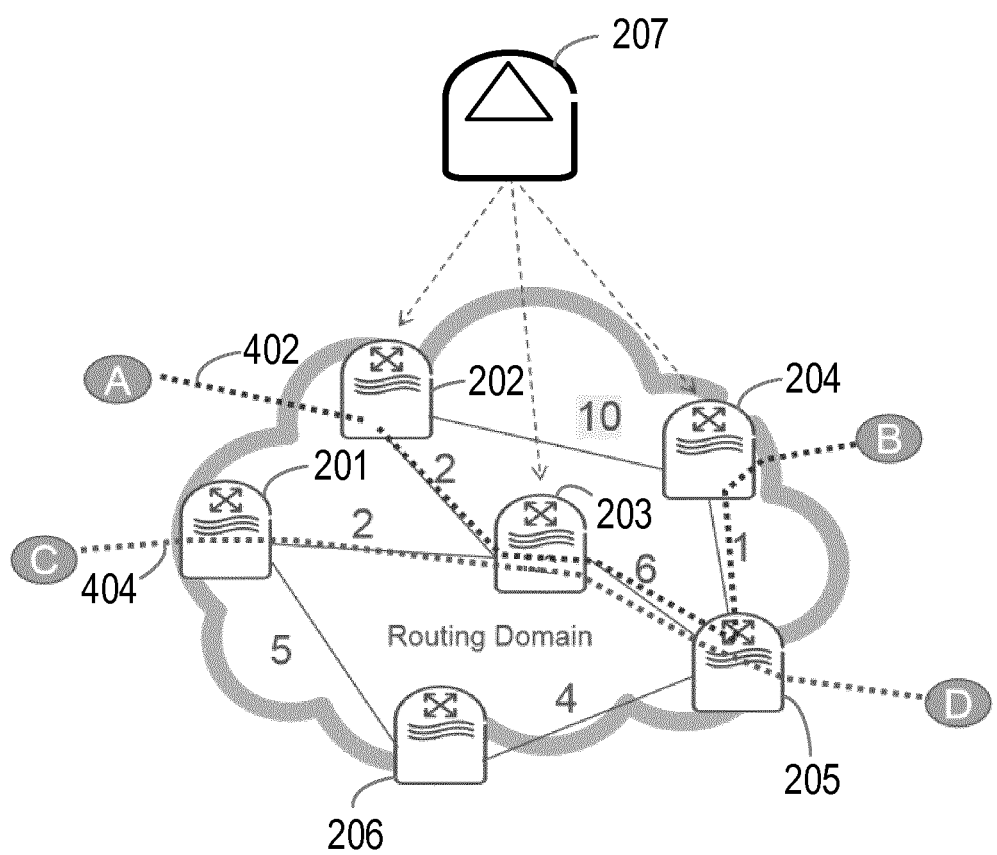

Turning now to FIG. 4, which shows the same group of nodes as was illustrated in FIGS. 2 and 3, in this embodiment, the values of one or more parameters acquired by the first reinforcement learning agent 207 in step 102 may comprise an administrative link cost and/or an indication of the load of each node in the first group of nodes (e.g. buffer or queue size of each node). Based on the acquired values, the first reinforcement learning agent 207 may increase the administrative link cost of the over utilized link (e.g. the link between nodes 202 and 204), as shown in FIG. 4 whereby the administrative link cost of the link between nodes 202 and 204 has been increased from a value of "2" to a value of "10". As will be familiar to the skilled person, it is not possible for the first reinforcement agent to know a priori what value of administrative link cost for the over utilised link will improve the congestion situation. Therefore the change to "10" may comprise an initial attempt by the first reinforcement learning agent 207. Appropriate learning processes and strategies adopted by the first learning agent (e.g. methodologies for choosing the value(s) for each action or adjustment performed by the first reinforcement learning agent) will be familiar to the skilled person. For example, the first reinforcement learning agent may employ a Markov Decision Process, however the skilled person will appreciate that this is merely an example and that other processes are also possible.

The updated administrative link costs are advertised (e.g. distributed or sent) to the first group of nodes, so that traffic is forwarded based on the adjusted administrative link costs. As shown in FIG. 4, due to the adjustment made by the first reinforcement learning agent, traffic flow 402 from A to B now flows through nodes 202, 203, 205 and 204. Traffic flow 404 from C to D now flows through nodes 201, 203 and 205. In this example, the adjustment has moved has moved the congestion situation from the link between nodes 202 and 204 to the link between nodes 203 and 205.

Figure 5:
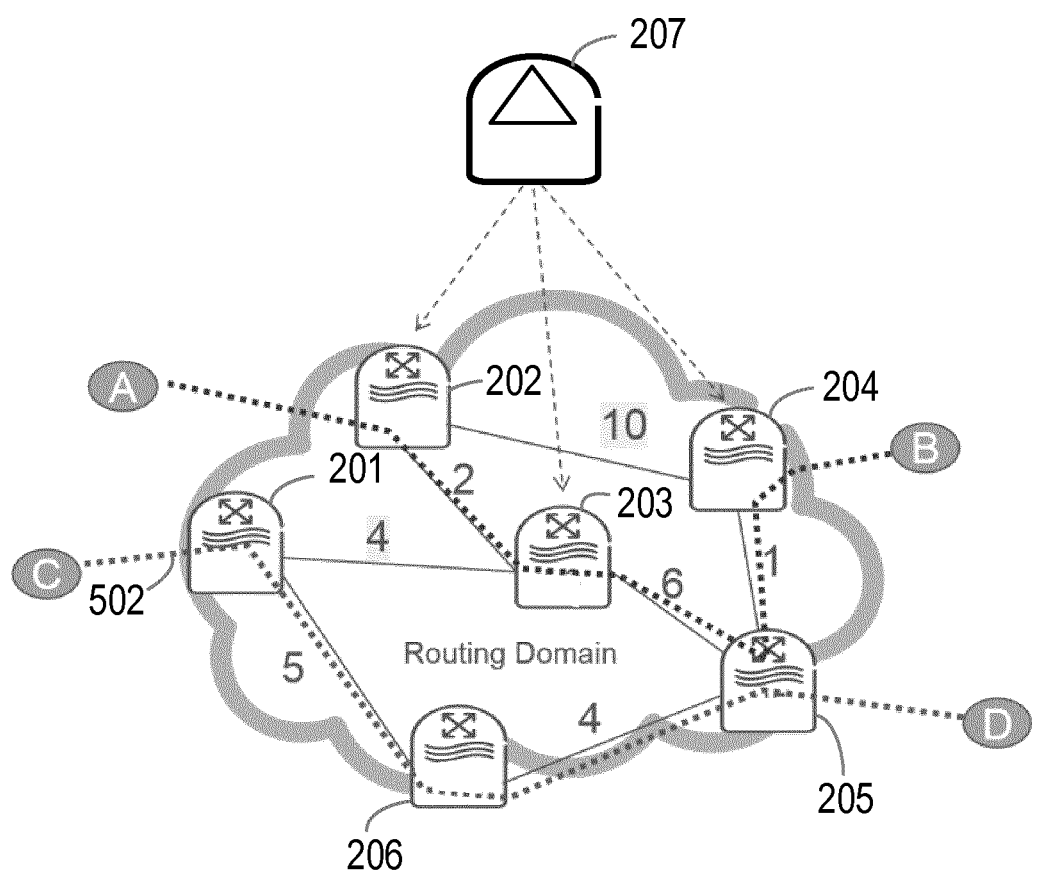

The first reinforcement agent 207 may then acquire new (e.g. updated) values of the one or more parameters (e.g. buffer or queue size of each node as before) and make a new adjustment to an administrative link cost based on the new values. In this example, the first reinforcement learning agent may adjust the cost of the link between nodes 201 and 203, for example to a value of "4" as is shown in FIG. 5. In this case, the path along nodes 201-206-205 becomes cheaper (e.g. has a lower cumulative administrative link cost) than the path 201-203-205 and thus, traffic flow 502 from C to D is diverted through nodes 201-206-205.

Figure 6:
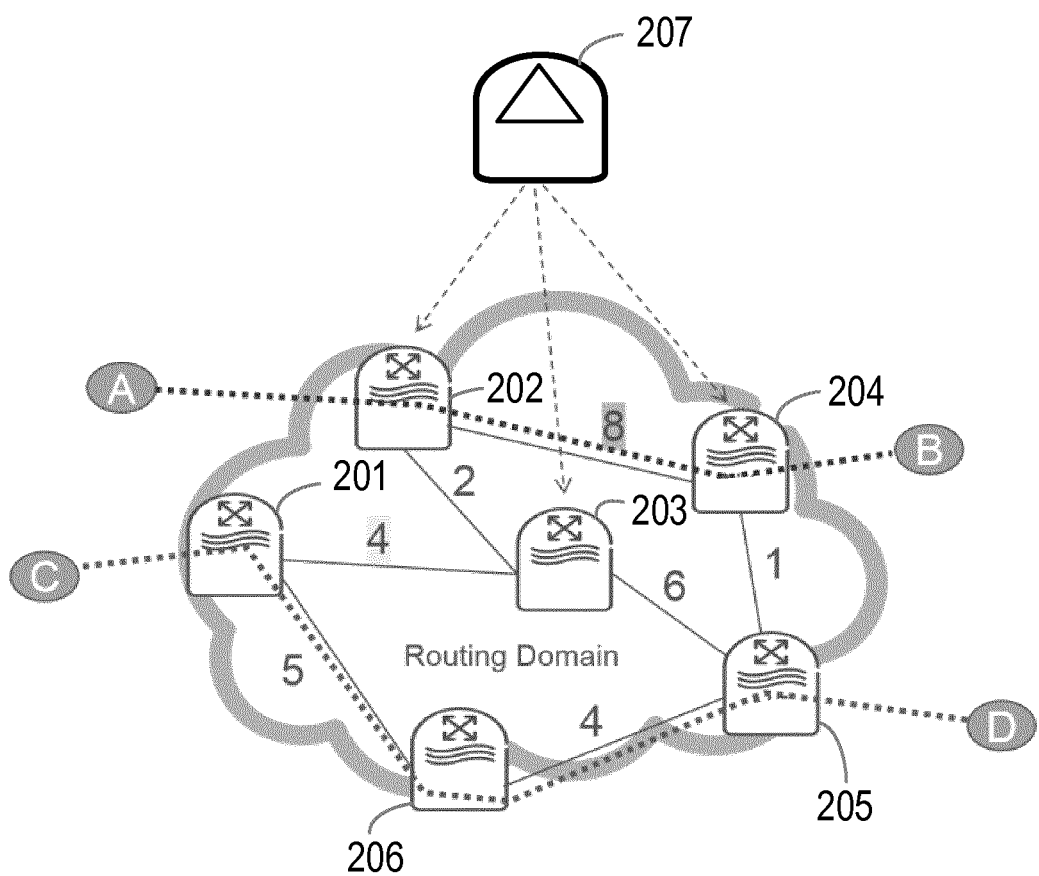

FIG. 6 shows that a further adjustment made by the first reinforcement learning agent to the link cost of the link 202-204 from "10" to "8" diverts traffic flowing through nodes 202-203-205-204 through nodes 202-204, which uses one link instead of three. This leaves more room to add new traffic flows and keeps the telecommunications network better optimized (and also decreases the propagation delay of traffic flowing from A to B). It is noted that it may take the first reinforcement learning agent more than one adjustment (e.g. initially via trial and error, and later based on insights from previous adjustments) to determine the optimal administrative link cost values.

In some embodiments, after the step of using 104 the first reinforcement learning agent to dynamically adjust a first routing metric, the method 100 may further comprise advertising an adjusted routing metric to nodes in a group of nodes (e.g. such as the first group of nodes), for use by routing functions in the nodes. In this way, the adjusted routing metrics are distributed to the nodes for use in routing traffic through the nodes.

In some embodiments (as shown in FIG. 1a) after the step of using 104 the first reinforcement learning agent to dynamically adjust a first routing metric, the method 100 may further comprise sending 108 the adjusted first routing metric to one or more nodes in a group of nodes (e.g. such as nodes in the first group of nodes), for use by routing functions in the one or more nodes. In this way, the adjusted routing metric is distributed to the nodes for use in routing traffic through the nodes. The first routing metric may be sent using existing communication protocols used to send routing metrics to nodes in the first group of nodes. Furthermore, the first routing metric may be used according to existing rules and procedures for using routing metrics. As such, the methods described herein may provide improved routing with minimal updates to existing network protocols and systems.

In some embodiments, the reinforcement learning agent receives a reward in response to a change in state caused by each action performed by the reinforcement learning agent. The skilled person will be familiar with rewards given to reinforcement learning agents. In some embodiments the reward is allocated by a reward function. A reward function may be configured, for example, by a network administrator according to an objective (or goal). The reward function may be configured, for example, to allocate rewards so as to optimise one or more key performance indicators of the network. In some embodiments, a reward received by the first reinforcement learning agent with respect to an adjustment of the first routing metric is determined based on a change in distribution of traffic between different nodes in the first group of nodes. For example, where an action or adjustment of the first routing metric (such as an administrative link cost) performed by the first reinforcement learning agent results in a state change (e.g. new traffic flow distribution), the first reinforcement agent may receive a reward based on whether the state change produces a result that is closer or further away from the objective (e.g. goal) of the first reinforcement learning agent.

In some embodiments, the first reinforcement learning agent receives a positive reward if one or more of the following conditions are satisfied:

i) the traffic is distributed more evenly throughout the first group of nodes after the adjustment is performed, compared to before the adjustment is performed. This may help to balance traffic load through the first group of nodes.

ii) the distribution of traffic through the first group of nodes is distributed more closely towards a predefined distribution after the adjustment is performed, compared to before the adjustment is performed. For example, the first reinforcement learning agent may take actions (e.g. make adjustments) to establish a predefined pattern of traffic through the first group of nodes.

iii) the traffic flow through an overloaded node in the first group of nodes is reduced after the adjustment is performed, compared to before the adjustment was performed. In this way, use of the first learning agent may be used to reduce congestion in the network.

iv) the load of a particular link between two nodes in the first group of nodes moves towards a predefined threshold load after the adjustment is performed, relative to before the adjustment is performed. In this way, the first reinforcement node may be used to adjust the traffic flowing through particular links towards a target utilisation.

v) the load of a particular link between two nodes in the network moves towards a predefined percentage threshold of the total traffic on the first group of nodes after the adjustment is performed, relative to before the adjustment is performed. For example, it may be desirable for one or more nodes in the first group of nodes to carry a particular percentage of the overall traffic flowing through the first group of nodes.

vi) a performance indicator changes to within (or towards) a predefined range after the adjustment is performed, relative to before the adjustment is performed. This may enable the reinforcement learning agent to adjust the traffic to improve a network metric (e.g. such as throughput).

It will be apparent to the skilled person that if a condition above is not satisfied (or the reverse of a condition is true) then the first reinforcement learning agent may receive a negative reward.

In some embodiments, the first reinforcement learning agent may be configured to operate a policy optimisation process. As noted above, a policy may comprise a set of learnt rules or actions that the reinforcement learning agent has learnt and can therefore be used to produce a (more) predictable outcome. Policy optimisation comprises using the principles of reinforcement learning to improve (e.g. optimise) the rules/actions used to adjust the system. The skilled person will be familiar with policy optimisation processes, such as for example, the aforementioned Markov Decision Process.

In some embodiments, the policy optimisation process of the first reinforcement learning agent may be configured to optimise a first aspect of the traffic flow through the first group of nodes. For example the first reinforcement learning agent may have a first objective (or goal). The policy optimisation may be based on one or more of the criteria above, for example, the optimisation task may comprise, for example, the first reinforcement learning agent being configured to optimise the distribution of traffic through the first group of nodes, move the distribution of traffic towards a predefined distribution, change the distribution to reduce overload on a node, change the distribution of traffic so that a load on a particular link moves towards a predefined threshold load and/or adjust the distribution of traffic so that a performance indicator changes to within a predefined range.

Figure 7A:
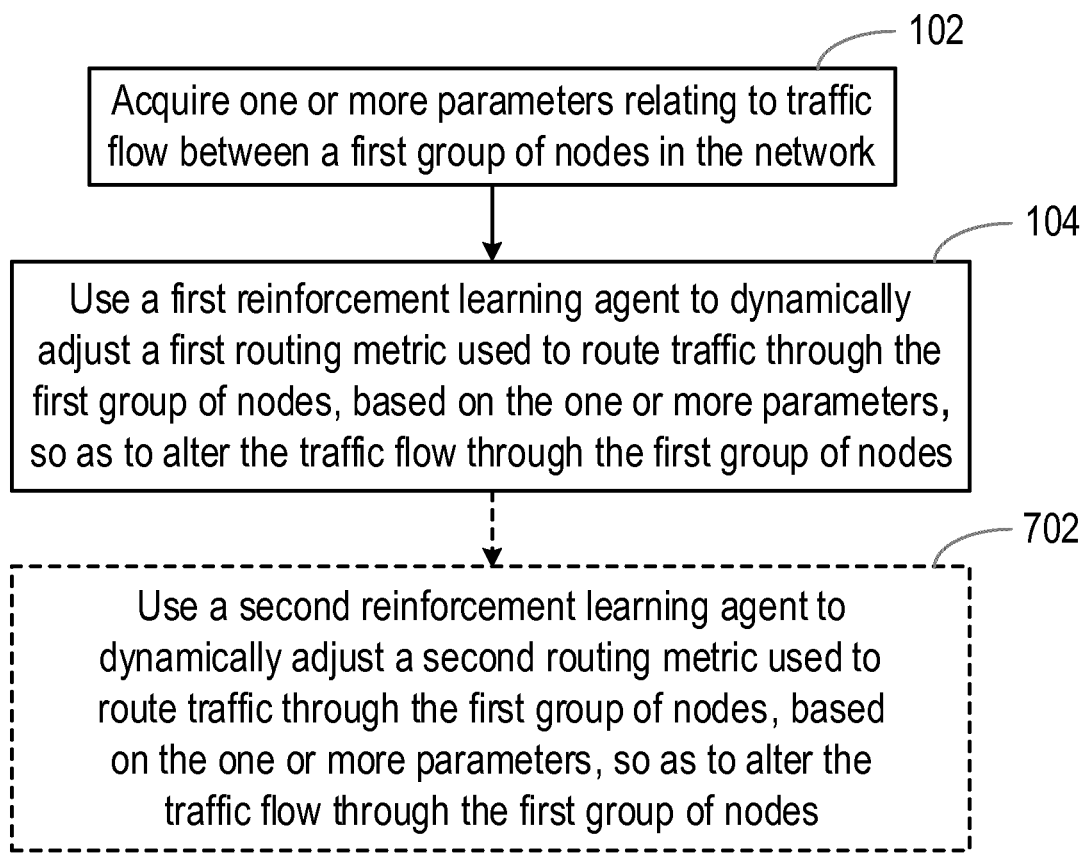
FIG. 7*a* shows a further example method according to some embodiments.

FIG. 7a shows another method according to an embodiment herein. In some embodiments, as shown in FIG. 7a, the method 100 may further comprise a step of using 702 a second reinforcement learning agent to dynamically adjust a second routing metric used to route traffic through the first group of nodes, based on the values of the one or more parameters, so as to alter the traffic flow through the first group of nodes. The second routing metric may be the same type of routing metric as the first routing metric, or a different type of routing metric.

In some embodiments, the second reinforcement learning agent may operate a second policy optimisation process and the policy optimisation process of the second reinforcement learning agent may be configured to optimise a second aspect of the traffic flow through the first group of nodes. For example the first reinforcement learning agent may have a second objective (or goal). In some embodiments, the first and second aspects (and thus the objectives of the first and second reinforcement learning agents) may be different. For example, the first reinforcement learning agent may be configured to adjust the flow of traffic through the first group of nodes so as to produce a more even traffic distribution (e.g. minimise congestion and/or underutilisation of nodes), whilst the second reinforcement learning agent may be configured to adjust the flow of traffic through the first group of nodes so as to ensure the traffic through one of the nodes in the first group of nodes does not exceed a threshold throughput.

In some embodiments, the first reinforcement learning agent and the second reinforcement learning agents may co-ordinate with one another (e.g. by sharing information or assigning rewards to one another in response to actions) so as to reach their policy optimisation goals.

Figure 7B:
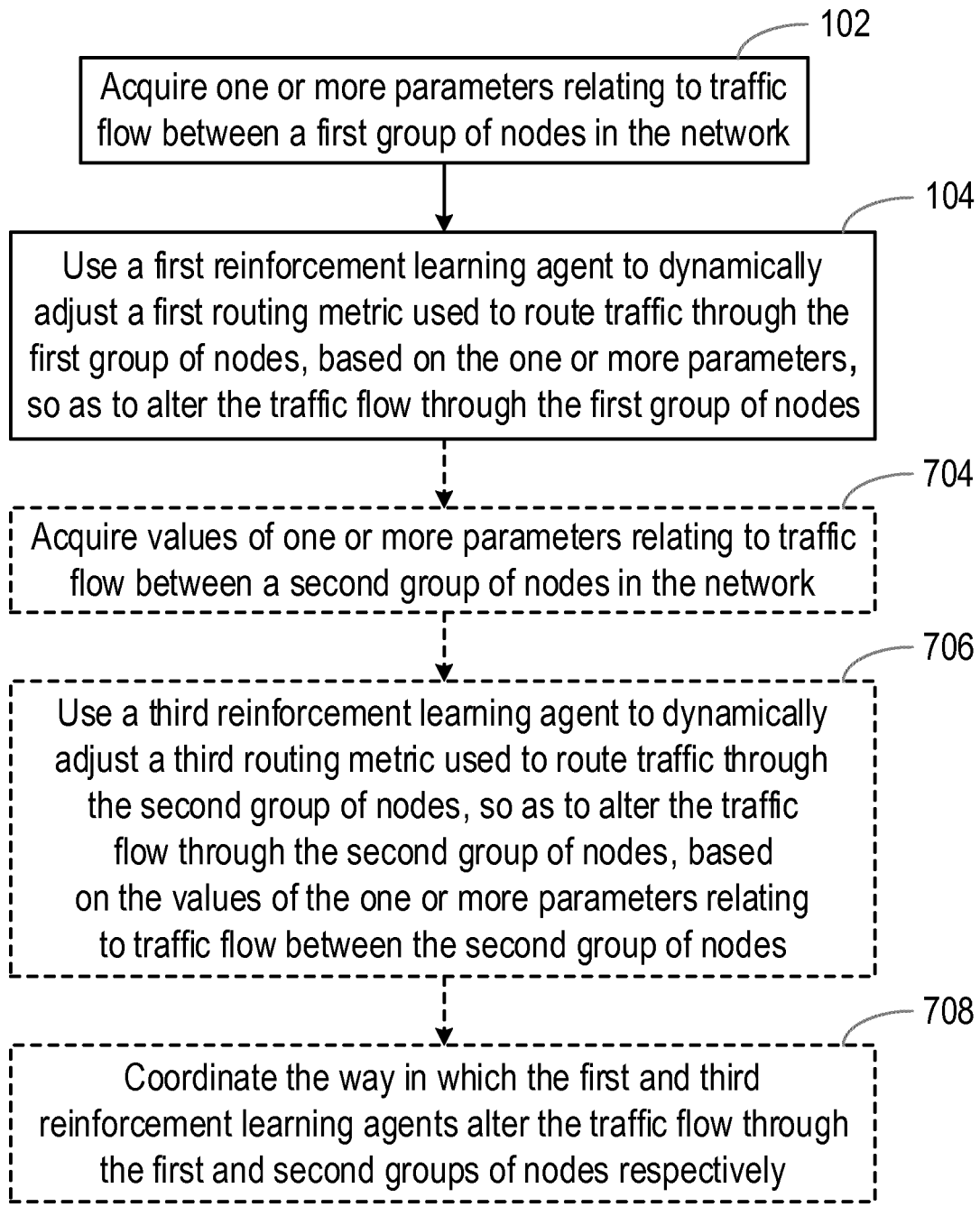
FIG. 7*b* shows a further example method according to some embodiments.

Turning now to other embodiments, as shown in FIG. 7b, in some embodiments, method 100 further comprises a step of acquiring 704 values of one or more parameters relating to traffic flow between a second group of nodes in the network. Method 100 may further comprise a step of using 706 a third reinforcement learning agent to dynamically adjust a third routing metric used to route traffic through the second group of nodes, so as to alter the traffic flow through the second group of nodes, based on the values of the one or more parameters relating to traffic flow between the second group of nodes, and coordinating 708 the way in which the first and third reinforcement learning agents alter the traffic flow through the first and second groups of nodes respectively.

The third routing metric that is adjusted by the third reinforcement learning agent may comprise the same type of routing metric or a different type of routing metric as the first routing metric that is adjusted by the first reinforcement learning agent, as described above with respect to step 104 of method 100. In some embodiments, the third routing metric adjusted by the third reinforcement learning agent comprises an administrative link cost between two nodes in the second group of nodes. The details provided above with respect to the first reinforcement agent (e.g. in the description relating to step 104 of method 100), including details of the different possible types of agents that the first reinforcement learning agent may comprise and the possible criteria for the first reinforcement learning agent receiving a positive reward, apply equally, mutatis mutandis, to the third reinforcement agent and the second group of nodes.

The step of coordinating 708 the way in which the first and third reinforcement learning agents alter the traffic flow through the first and second groups of nodes respectively generally may comprise coordinating traffic flow between the first group of nodes and the second group of nodes to ensure that the adjustments to the first routing metric, as performed by the first reinforcement learning agent and the adjustments to the third routing metric as performed by the third reinforcement agent, are compatible with (e.g. do not adversely affect) the second and first groups of nodes respectively.

Figure 7C:
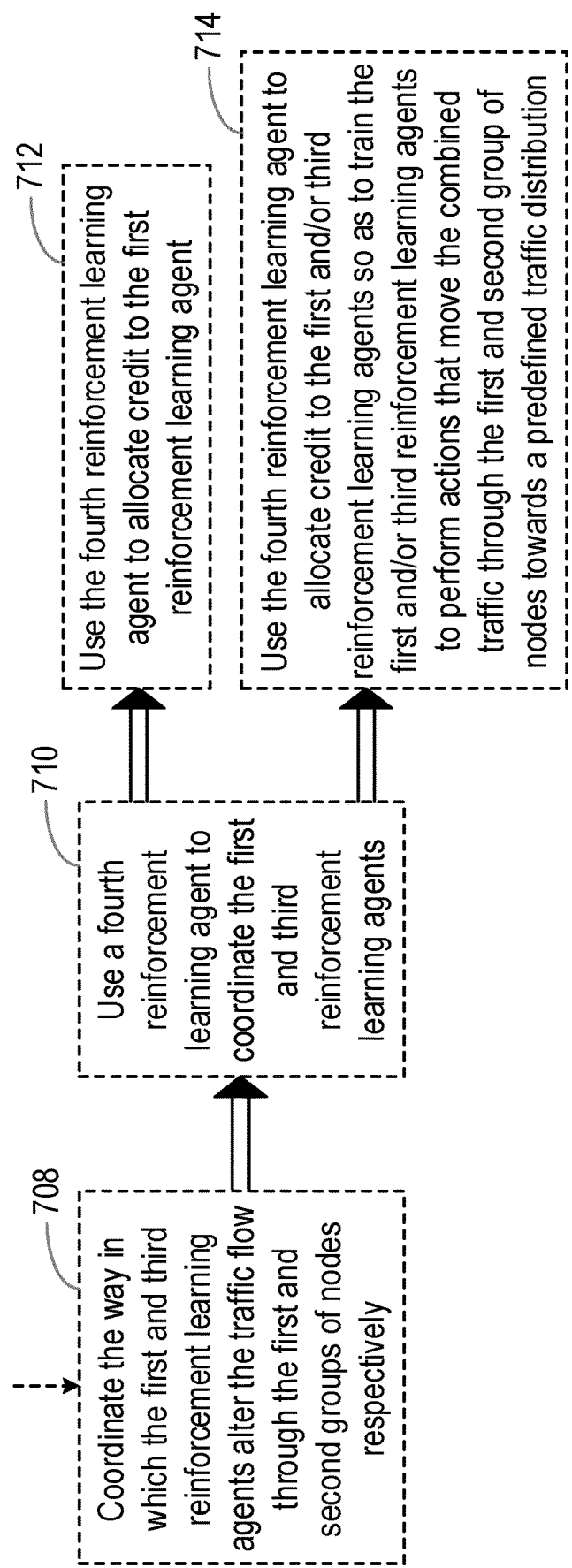
FIG. 7*c* shows a further example method according to some embodiments.

In some embodiments, as shown in FIG. 7c, coordinating 708 the way in which the first and third reinforcement learning agents alter the traffic flow through the first and second groups of nodes may comprise using 710 a fourth reinforcement learning agent to coordinate the first and third reinforcement learning agents.

As such, the first, third and fourth reinforcement learning agents may have a parent-child relationship. In some embodiments, the fourth reinforcement learning agent may act as a parent reinforcement learning agent to the first and third reinforcement learning agents and the first and third reinforcement learning agents may act as child reinforcement learning agents with respect to the fourth reinforcement learning agent.

Figure 8:
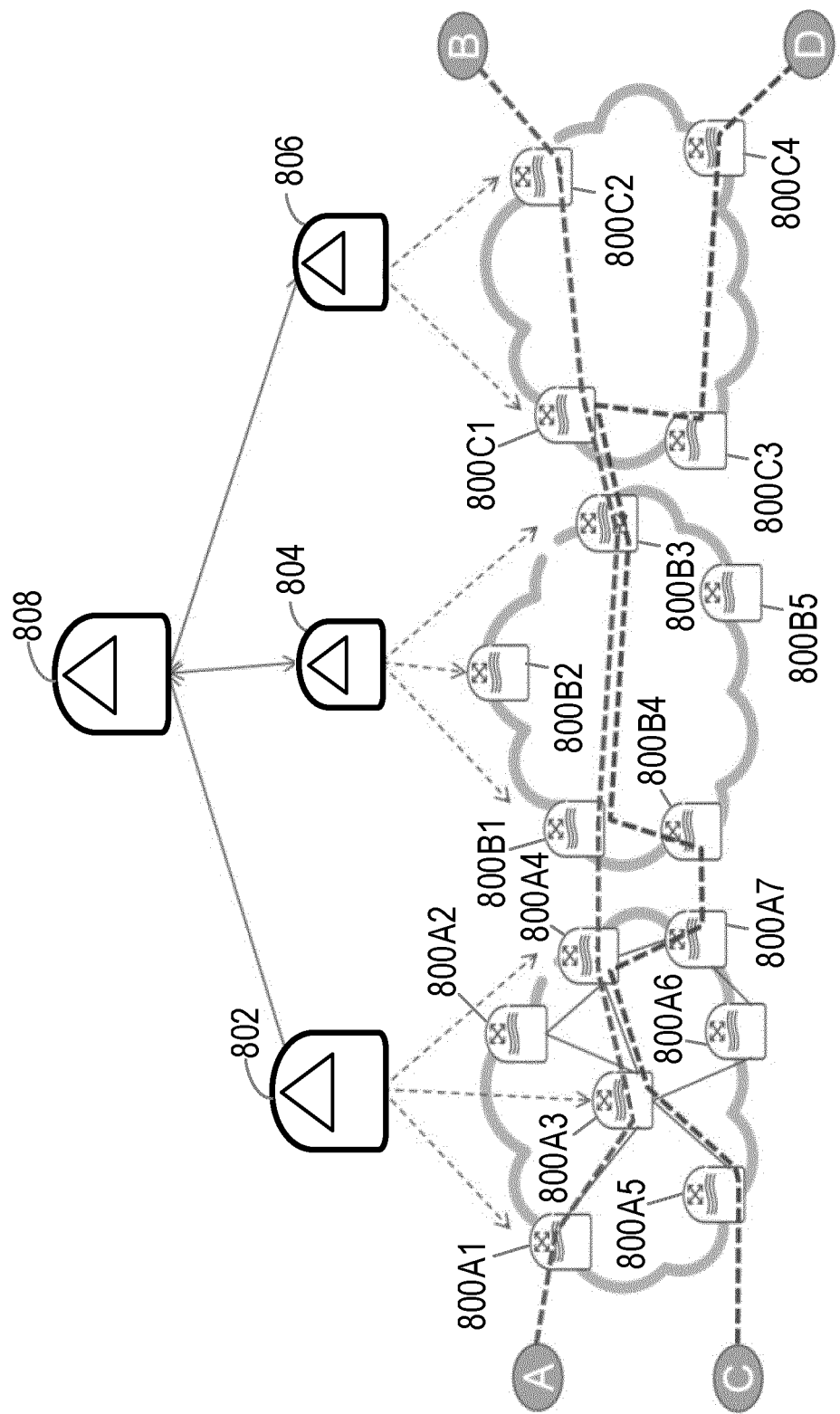
FIG. 8 illustrates how reinforcement learning agents may be applied hierarchically according to some embodiments.

This is illustrated in FIG. 8 which shows a first reinforcement learning agent 802 a third reinforcement learning agent 804 and a fourth reinforcement agent 808. The fourth reinforcement learning agent 808 is a parent reinforcement learning agent to the first and third reinforcement learning agents 802 and 804. FIG. 8 also shows a first group of nodes comprising nodes 800A1-800A7 and a second group of nodes comprising nodes 800B1-800B5. The first reinforcement agent 802 is configured to dynamically adjust a first routing metric used to route traffic through the first group of nodes 800A1-800A7 and the third reinforcement agent 804 is configured to dynamically adjust a third routing metric used to route traffic through the second group of nodes 800B1-800B7. In this embodiment, the fourth reinforcement learning agent 808 is also a parent reinforcement learning agent to a fifth reinforcement learning agent 806, that is configured to dynamically adjust a fourth routing metric used to route traffic through a third group of nodes 800C1-800C4. It will be understood that the fourth reinforcement learning agent 808 may further act as a parent to subsequent reinforcement learning agents and subsequent groups of nodes.

In some embodiments, the fourth reinforcement agent 808 may use credit assignment (e.g. rewards) to influence the global traffic distribution across the first second (and/or third and subsequent) groups of nodes with the goal of optimizing a higher level policy function or objective. For example, the fourth (e.g. parent) reinforcement learning agent can assign credit (e.g. a reward as described above) to a child agent to stimulate or penalise certain actions (or behaviour). In this way, the fourth reinforcement learning agent 808 can ensure that the adjustments (e.g. actions) made by one reinforcement learning agent do not negatively impact the telecommunications network as a whole.

Returning to FIG. 7c, as such, in some embodiments, the step of using 710 a fourth reinforcement learning agent to coordinate the first and third reinforcement learning agents (as referred to above) may comprise at least one of:

i) using 712 the fourth reinforcement learning agent 808 to allocate credit to the first reinforcement learning agent 802 based on the effect that an action performed by the first reinforcement learning agent has on the traffic through the first group of nodes (800A1-800A7). As such, the parent node may assign credit to the first reinforcement learning agent to influence the traffic flow through the first group of nodes (e.g. the group of nodes that the first reinforcement learning agent 802 is directly responsible for).

ii) using 712 the fourth reinforcement learning agent 808 to allocate credit to the first reinforcement learning agent 802 based on the effect that an action performed by the first reinforcement learning agent has on the traffic through the second group of nodes (800B1-800B5). In this way, the fourth reinforcement learning agent 808 is able to influence the adjustments made by the first reinforcement learning agent 802 to the first group of nodes in order to effect change in the traffic through though the second group of nodes (e.g. a group of nodes that the first reinforcement learning agent is not aware of). This may be used, for example, where adjustments (e.g. actions) performed by the first reinforcement learning agent inadvertently cause congestion in the second group of nodes.

iii) using 712 the fourth reinforcement learning agent 808 to allocate credit to the first reinforcement learning agent 802 based on the effect that an action performed by the first reinforcement learning agent 802 has on the traffic flowing between two nodes that link the first group of nodes to the second group of nodes. For example, the fourth reinforcement learning agent may be able to assign credit in order to reduce overload on links between the first group of nodes and the second group of nodes.

Generally, the fourth reinforcement learning agent 808 may allocate positive credit to the first reinforcement learning agent (or any other child reinforcement learning agent) if an action of the first reinforcement learning agent moves the global traffic distribution flowing through the first and second groups of nodes towards an objective (or goal) of the fourth reinforcement learning agent 808. Examples of where a positive credit may be assigned to the first reinforcement learning agent by the fourth reinforcement learning agent include if an action (such as an adjustment to the first routing metric): improves the traffic distribution in the second group of nodes, causes more even traffic distribution in the second group of nodes, reduces traffic flow through an overloaded node in the second group of nodes and/or improves the traffic distribution between nodes that link the first group of nodes to the second group of nodes compared to before the action was performed.

Conversely, a negative credit may be assigned by the fourth reinforcement learning agent to the first reinforcement learning agent, if an action of the first reinforcement learning agent: causes more uneven traffic distribution in the second group of nodes, increases traffic flow through an overloaded node in the second group of nodes, and/or causes a node in the second group of nodes to become overloaded, compared to before the action was performed. In this way, the first reinforcement learning node can be given feedback to prioritise actions that move the network as a whole towards the overall (or global) objective of the fourth reinforcement learning agent.

Generally, therefore the method 100 may comprise using 714 the fourth reinforcement learning agent to allocate credit to the first and/or third reinforcement learning agents so as to train the first and/or third reinforcement learning agents to perform actions that move the combined traffic through the first and second group of nodes towards a predefined traffic distribution (e.g. to optimize a higher level policy function/ objective).

In some embodiments, each group of nodes (e.g. first, second and/or third and subsequent) comprises a software defined network (SND) control area. In some embodiments, each child reinforcement learning agent (e.g. first, third, fifth) may be comprised in (e.g. hosted on) a respective software defined network controller. In this way, reinforcement learning may be used to improve and coordinate traffic flow through multi domain networks controlled by a hierarchy of SDN controllers.

Returning now to FIG. 8, in a hierarchical scenario such as that depicted in FIG. 8, the fourth reinforcement learning agent 808 (parent agent) may have access to different information about nodes and the links between nodes of the first (800A1-800A7), second (800B1-800B5) and third (800C1-800C4) and subsequent groups of nodes.

For example, in some embodiments, the fourth reinforcement learning 808 agent may acquire values of one or more parameters related to the first, second or third groups of nodes. These values may, for example, provide of indication of the number and/or types of nodes in each group of nodes, in addition or alternatively to an administrative link cost and/or an indication of traffic flow between each pair of nodes in each group of nodes. This is illustrated by the first group of nodes, nodes (800A1-800A7) in FIG. 8, whereby the fourth reinforcement learning agent 808 has full visibility of each node in the first group of nodes, as well as the administrative link cost and load on each link between each pair of nodes in the first group of nodes.

In some embodiments, one or more of the administrative link costs and/or the links themselves may be hidden (e.g. unavailable) to the fourth reinforcement learning agent 808. This may, for example, occur due to privacy reasons. This scenario is illustrated for the second group of nodes in FIG. 8 (e.g. nodes 800B1-800B5), whereby the fourth reinforcement learning agent has visibility of nodes through which traffic flows into and out of the second group of nodes. Any intermediate nodes are hidden from the fourth reinforcement learning agent 808 (although they may not be hidden from the child reinforcement learning agent 804).

Three scenarios may arise in the scenario depicted in FIG. 8. Firstly, as discussed above, overload may arise between two nodes in the same group of nodes, for example, nodes 800A3 and 800A4. In this scenario, both the first reinforcement learning agent 802 and the fourth reinforcement learning agent (e.g. both parent and child agents) have full visibility of all nodes involved in the overload. In some embodiments, this situation may be resolved by the first reinforcement learning agent (e.g. the child), according to the methods detailed above with respect to method step 104 of method 100. The details therein will be understood to apply equally to this embodiment.

In a second scenario, overload may arise between two links that are hidden from the fourth reinforcement learning agent, for example, an (unknown) link between nodes 800B1 and 800B3. In this scenario, in some embodiments, the fourth reinforcement learning agent 808 may send a message to the third reinforcement learning agent 804, requesting the third reinforcement agent 804 perform adjustments to the third routing metric (e.g. performs actions) to resolve the problem. For example, the fourth reinforcement learning agent 808 may adjust the objective (or goal) of the optimization policy of the third reinforcement learning agent, to encourage the third reinforcement learning agent to resolve the problem. Alternatively or in addition, the fourth reinforcement learning agent 808 may assign credit to the third reinforcement learning agent 804 that rewards the third reinforcement learning agent when the overload is reduced.

In a third scenario, a link between different groups of nodes may become overloaded, for example a link between a node in the third group of nodes and a node in the fourth group of nodes may become overloaded, such as the link between nodes 800B3 and 800C1. In such a scenario, the fourth reinforcement learning agent may send a message to the third reinforcement learning agent 804 to distribute traffic sent from the second group of nodes to the third group of nodes more evenly through nodes 800B3 and 800B5. For example, the fourth reinforcement learning agent may adjust the objective (or goal) of the third reinforcement learning agent 804, to encourage the third reinforcement learning agent 804 to send traffic more evenly through nodes 800B3 and 800B5. Alternatively or in addition, the fourth reinforcement learning agent 808 may assign credit to the third reinforcement learning agent 804 that rewards the third reinforcement learning agent when the overload between links 800B3 and 800C1 is reduced.

In some embodiments, as noted above, as each reinforcement learning agent has only access to partial, (e.g. local) information, the goal, or policy to be optimized can be formalized as a Decentralized Partial-Observable Markov Decision Process (Dec-POMDPs). In this sense, the fourth reinforcement learning agent (e.g. parent agent) may act as a global credit assignment function to solve a global optimization task and also avoid situations where contradicting local optimization decisions are prioritized over a global optimization goal.

In embodiments where the telecommunications network comprises a plurality of SDN control groups controlled by a hierarchy of SDN controllers (each group of nodes corresponding to an SDN control group and each reinforcement learning agent being comprised in a corresponding SDN controller), the solutions above may be implemented with minimal modifications to the SDN controllers. For example, with respect to the first scenario above, the solution may be implemented by modifying an interface between SDN controllers (e.g. of the fourth reinforcement learning agent and/or the first, third and fifth reinforcement learning agents) to enable the interface to issue commands to instigate dynamic modification of an administrative link cost. The adjusted link cost may then be advertised (e.g. distributed) using the interface, to relevant nodes in the first, second and third groups of nodes. Traffic flows according to the normal rules and procedures of SDN non-traffic engineered networks (e.g. only the values of the routing metrics are adjusted—not how the routing metrics are used).

With respect to the second scenario above, the interface between SDN controllers may be extended to send a message to the child reinforcement learning agent to resolve the problem. In some embodiments, such a message may include information that the third reinforcement learning agent needs to adjust a network metric (e.g. an administrative link cost) to resolve the congestion situation. With respect to the third scenario, the interface between the SDN controllers may be extended to request the third reinforcement learning agent to modify administrative link costs so that a different path may be found between different border nodes. As such the solutions herein may be implemented with minimal structural and/or upgrades to the SDN controllers.

Figure 9:
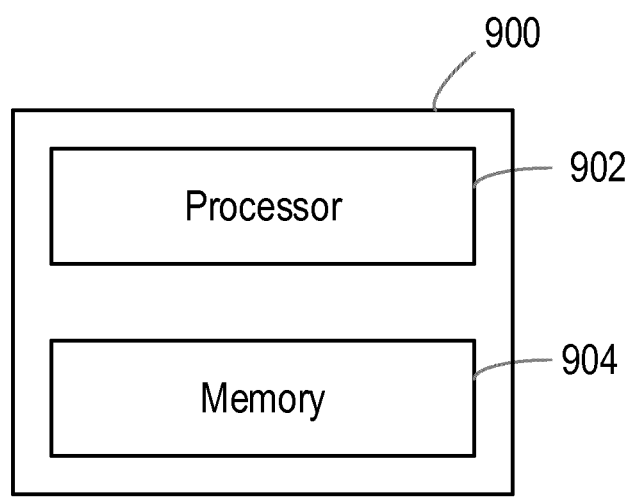
FIG. 9 illustrates an example node according to an embodiment.

Turning now to FIG. 9, according to some embodiments, there is a node 900 in a telecommunications network. The node 900 comprises a processor 902 and a memory 904. In some embodiments, the memory 904 contains instructions executable by the processor 902. The node 900 may be operative to perform the methods described herein, such as the method 100. For example, in some embodiments, the instructions when executed by the processor 902 may cause the processor 902 to perform the methods described herein.

In some embodiments, the node may comprise, or may comprise part of an SDN controller.

The memory 904 may be configured to store the instructions in the form of program code that can be executed by the processor 902 to perform the method described herein. In some implementations, the instructions can comprise a plurality of software and/or hardware modules that are each configured to perform, or are for performing, individual or multiple steps of the method described herein. In some embodiments, the memory 904 may be part of a device that also comprises one or more other components of the node 900 (for example, the processor 904 and/or one or more other components of the node 900). In alternative embodiments, the memory 904 may be part of a separate device to the other components of the node 900.

The processor 902 of the node 900 can be configured to communicate with the memory 904 to execute the instructions. The processor 902 can comprise one or more processors, processing units, multi-core processors or modules that are configured or programmed to control the node 900 in the manner described herein. In some implementations, for example, the processor 902 may comprise a plurality of processors, processing units, multi-core processors and/or modules configured for distributed processing. It will be appreciated by a person skilled in the art that such processors, processing units, multi-core processors and/or modules may be located in different locations and may each perform different steps and/or different parts of a single step of the method described herein.

Briefly, the node 900 is operative to (e.g. adapted to) acquire values of one or more parameters relating to traffic flow between a first group of nodes in the network and use a first reinforcement learning agent to dynamically adjust a first routing metric used to route traffic through the first group of nodes, based on the values of the one or more parameters, so as to alter the traffic flow through the first group of nodes.

In this way, reinforcement learning may be used to dynamically adjust routing metrics (e.g. such as administrative link costs) in a first group of nodes in a telecommunications network so as to change a traffic distribution through the first group of nodes. In this way, the traffic distribution through the first group of nodes may be adjusted towards a preferred distribution, for example, minimising congestion and reducing under-utilisation of links, leading to better performance of traffic routing through the first group of nodes.

In some embodiments, the processor 902 may be operative (e.g. adapted) to control the memory 904 to store data or information relating to the methods described herein. For example, the memory 904 may be used to store the acquired values of the one or more parameters.

In some embodiments, the node 900 may further comprise an interface (not illustrated in FIG. 9) capable of (e.g. adapted to, operative to, or configured to) send or receive data used in the method described herein. For example, the node 900 being operative to acquire values of one or more parameters may comprise the node 900 being operative to receive the values using the interface, for example, from nodes in the first group of nodes in the network. The interface may be used in wired and/or wireless communication of signalling and/or data between node 900 and other nodes in the first group of nodes and/or a wider telecommunications network. Such an interface may further comprise radio front end circuitry that may be coupled to, or in certain embodiments a part of, an antenna to facilitate wireless communication, for example, to and from the nodes in the first group of nodes. The skilled person will appreciate that an interface may comprise different components and/or different combinations of components to those described herein, depending on the type of interface and/or whether the interface is configured for wired or wireless communications (or both). For example, if the interface is configured for wireless communication, the interface may comprise filters and/or amplifiers to convert digital data into a radio signal having appropriate channel and bandwidth parameters.

In more detail, in some embodiments, the first routing metric comprises an administrative link cost between two nodes in the first group of nodes.

In some embodiments the node 900 being operative to use a first reinforcement learning agent comprises the node 900 being operative to use the first reinforcement learning agent to perform one or more actions, each action comprising increasing or decreasing the value of an administrative link cost between two nodes in the first group of nodes.

In some embodiments the node 900 is operative such that a reward received by the first reinforcement learning agent with respect to an adjustment of the first routing metric is determined based on a change in distribution of traffic between different nodes in the first group of nodes.

In some embodiments the node 900 is operative such that the first reinforcement learning agent receives a positive reward if one or more of the following conditions are satisfied:
  i) the traffic is distributed more evenly throughout the first group of nodes after the adjustment is performed, compared to before the adjustment is performed;
  ii) the distribution of traffic through the first group of nodes is distributed more closely towards a predefined distribution after the adjustment is performed, compared to before the adjustment is performed;
  iii) the traffic flow through an overloaded node in the first group of nodes is reduced after the adjustment is performed, compared to before the adjustment was performed;
  iv) the load of a particular link between two nodes in the first group of nodes moves towards a predefined threshold load after the adjustment is performed, relative to before the adjustment is performed;
  v) the load of a particular link between two nodes in the network moves towards a predefined percentage threshold of the total traffic on the first group of nodes after the adjustment is performed, relative to before the adjustment is performed; or
  vi) a performance indicator changes to within a predefined range after the adjustment is performed, relative to before the adjustment is performed.

In some embodiments the node 900 is operative such that the first reinforcement learning agent operates a policy optimisation process.

In some embodiments the node 900 is operative such that the policy optimisation process of the first reinforcement learning agent is configured to optimise a first aspect of the traffic flow through the first group of nodes.

In some embodiments the node 900 is further operative to use a second reinforcement learning agent to dynamically adjust a second routing metric used to route traffic through the first group of nodes, based on the values of the one or more parameters, so as to alter the traffic flow through the first group of nodes.

In some embodiments the second reinforcement learning agent is operative to operate a second policy optimisation process and the policy optimisation process of the second reinforcement learning agent is configured to optimise a second aspect of the traffic flow through the first group of nodes.

In some embodiments the node 900 is further operative to: acquire values of one or more parameters relating to traffic flow between a second group of nodes in the network, use a third reinforcement learning agent to dynamically adjust a third routing metric used to route traffic through the second group of nodes, so as to alter the traffic flow through the second group of nodes, based on the values of the one or more parameters relating to traffic flow between the second group of nodes, and coordinate the way in which the first and third reinforcement learning agents alter the traffic flow through the first and second groups of nodes respectively.

In some embodiments the third routing metric used to route traffic through the second group of nodes comprises an administrative link cost between two nodes in the second group of nodes.

In some embodiments the node 900 being operative to coordinate comprises the node 900 being operative to use a fourth reinforcement learning agent to coordinate the first and third reinforcement learning agents.

In some embodiments the node 900 being operative to coordinate further comprises the node 900 being operative to:
  i) use the fourth reinforcement learning agent to allocate credit to the first reinforcement learning agent based on the effect that an action performed by the first reinforcement learning agent has on the traffic through the first group of nodes;
  ii) use the fourth reinforcement learning agent to allocate credit to the first reinforcement learning agent based on the effect that an action performed by the first reinforcement learning agent has on the traffic through the second group of nodes; or
  iii) use the fourth reinforcement learning agent to allocate credit to the first reinforcement learning agent based on the effect that an action performed by the first reinforcement learning agent has on the traffic flowing between two nodes that link the first group of nodes to the second group of nodes.

In some embodiments the fourth reinforcement learning agent is operative to allocate positive credit to the first reinforcement learning agent if an action of the first reinforcement learning agent:
  i) improves the traffic distribution in the second group of nodes;
  ii) causes more even traffic distribution in the second group of nodes;
  iii) reduces traffic flow through an overloaded node in the second group of nodes; and/or
  iv) improves the traffic distribution between nodes that link the first group of nodes to the second group of nodes; compared to before the action was performed.

In some embodiments the node is operative to allocate negative credit if an action of the first reinforcement learning agent: causes more uneven traffic distribution in the second group of nodes; increases traffic flow through an overloaded node in the second group of nodes; or causes a node in the second group of nodes to become overloaded; compared to before the action was performed.

In some embodiments the node 900 being operative to use a fourth reinforcement learning agent to coordinate the first and third reinforcement learning agents comprises the node 900 being operative to use the fourth reinforcement learning agent to allocate credit to the first and/or third reinforcement learning agents so as to train the first and/or third reinforcement learning agents to perform actions that move the combined traffic through the first and second group of nodes towards a predefined traffic distribution.

In some embodiments the first, third and fourth reinforcement learning agents are operative to operate a decentralised partial observable Markov decision process.

In some embodiments the fourth reinforcement learning agent is operative to act as a parent reinforcement learning agent to the first and third reinforcement learning agents, and the first and third reinforcement learning agents are operative to act as child reinforcement learning agents to the fourth reinforcement learning agent.

In some embodiments the node 900 being operative to acquire values of one or more parameters relating to traffic flow between a first group of nodes comprises the node 900 being operative to acquire values of one or more parameters relating to traffic flow between a first group of nodes: in response to detecting traffic congestion between first and second nodes, or at periodic intervals.

In some embodiments the node 900 is further operative to advertise an adjusted routing metric to nodes in a group of nodes, for use by routing functions in the nodes.

In some embodiments the node 900 is further operative to send an adjusted routing metric to nodes in a group of nodes, for use by routing functions in the nodes.

In some embodiments the telecommunications network comprises a non-traffic engineered telecommunications network.

In some embodiments, there is a computer program comprising instructions which, when executed on at least one processor, cause the at least one processor to carry out any of the methods herein (for example, the method 100).

In some embodiments, there is also a computer program product comprising a computer-readable medium with a computer program as described above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

The invention claimed is:

1. A method in a telecommunications network, the method comprising:

acquiring values of one or more parameters relating to traffic flow between a first group of nodes in the network;

a first reinforcement learning agent dynamically adjusting a first routing metric used to route traffic through the first group of nodes, based on the values of the one or more parameters, so as to alter the traffic flow through the first group of nodes;

acquiring values of one or more parameters relating to traffic flow between a second group of nodes in the network;

using a third reinforcement learning agent to dynamically adjust a third routing metric used to route traffic through the second group of nodes, so as to alter the traffic flow through the second group of nodes, based on the values of the one or more parameters relating to traffic flow between the second group of nodes; and coordinating the way in which the first and third reinforcement learning agents alter the traffic flow through the first and second groups of nodes respectively.

2. The method as in claim 1, wherein the first routing metric comprises an administrative link cost between two nodes in the first group of nodes.

3. The method as in claim 2, wherein the first reinforcement learning agent dynamically adjusting the first routing metric comprises:

the first reinforcement learning agent performing one or more actions, each action comprising increasing or decreasing the value of an administrative link cost between two nodes in the first group of nodes.

4. The method as in claim 1, wherein a reward received by the first reinforcement learning agent with respect to an adjustment of the first routing metric is determined based on a change in distribution of traffic between different nodes in the first group of nodes.

5. The method as in claim 4, wherein the first reinforcement learning agent receives a positive reward if one or more of the following conditions are satisfied:

the traffic is distributed more evenly throughout the first group of nodes after the adjustment is performed, compared to before the adjustment is performed;

the distribution of traffic through the first group of nodes is distributed more closely towards a predefined distribution after the adjustment is performed, compared to before the adjustment is performed;

the traffic flow through an overloaded node in the first group of nodes is reduced after the adjustment is performed, compared to before the adjustment was performed;

the load of a particular link between two nodes in the first group of nodes moves towards a predefined threshold load after the adjustment is performed, relative to before the adjustment is performed;

the load of a particular link between two nodes in the network moves towards a predefined percentage threshold of the total traffic on the first group of nodes after the adjustment is performed, relative to before the adjustment is performed; or a performance indicator changes to within a predefined range after the adjustment is performed, relative to before the adjustment is performed.

6. The method as in claim 1, wherein the first reinforcement learning agent operates a policy optimisation process.

7. The method as in claim 6, wherein the policy optimisation process of the first reinforcement learning agent is configured to optimise a first aspect of the traffic flow through the first group of nodes.

8. The method as in claim 1, further comprising using a second reinforcement learning agent to dynamically adjust a second routing metric used to route traffic through the first group of nodes, based on the values of the one or more parameters, so as to alter the traffic flow through the first group of nodes.

9. The method as in claim 8, wherein the second reinforcement learning agent operates a second policy optimisation process and the policy optimisation process of the second reinforcement learning agent is configured to optimise a second aspect of the traffic flow through the first group of nodes.

10. The method as in claim 1, wherein the third routing metric used to route traffic through the second group of nodes comprises an administrative link cost between two nodes in the second group of nodes.

11. The method as in claim 1, wherein coordinating comprises using a fourth reinforcement learning agent to coordinate the first and third reinforcement learning agents.

12. The method as in claim 11, wherein coordinating further comprises:
using the fourth reinforcement learning agent to allocate credit to the first reinforcement learning agent based on the effect that an action performed by the first reinforcement learning agent has on the traffic through the first group of nodes;
using the fourth reinforcement learning agent to allocate credit to the first reinforcement learning agent based on the effect that an action performed by the first reinforcement learning agent has on the traffic through the second group of nodes; or
using the fourth reinforcement learning agent to allocate credit to the first reinforcement learning agent based on the effect that an action performed by the first reinforcement learning agent has on the traffic flowing between two nodes that link the first group of nodes to the second group of nodes.

13. The method as in claim 11, further comprising:
the fourth reinforcement learning agent allocating positive credit to the first reinforcement learning agent if an action of the first reinforcement learning agent:
improves the traffic distribution in the second group of nodes compared to before the action was performed;
causes more even traffic distribution in the second group of nodes compared to before the action was performed;
reduces traffic flow through an overloaded node in the second group of nodes compared to before the action was performed; and/or
improves the traffic distribution between nodes that link the first group of nodes to the second group of nodes compared to before the action was performed.

14. The method as in claim 11, further comprising:
allocating negative credit if an action of the first reinforcement learning agent:
causes more uneven traffic distribution in the second group of nodes compared to before the action was performed;
increases traffic flow through an overloaded node in the second group of nodes compared to before the action was performed; or
causes a node in the second group of nodes to become overloaded compared to before the action was performed.

15. The method as in claim 11, wherein using a fourth reinforcement learning agent to coordinate the first and third reinforcement learning agents comprises:
using the fourth reinforcement learning agent to allocate credit to the first and/or third reinforcement learning agents so as to train the first and/or third reinforcement learning agents to perform actions that move the combined traffic through the first and second group of nodes towards a predefined traffic distribution.

16. The method as in claim 11, wherein the first, third and fourth reinforcement learning agents operate a decentralised partial observable Markov decision process.

17. The method as in claim 11, wherein:
the fourth reinforcement learning agent acts as a parent reinforcement learning agent to the first and third reinforcement learning agents; and
the first and third reinforcement learning agents act as child reinforcement learning agents to the fourth reinforcement learning agent.

18. The method as in claim 1, wherein the step of acquiring values of one or more parameters relating to traffic flow between a first group of nodes is performed:
in response to detecting traffic congestion between first and second nodes; or at periodic intervals.

19. The method as in claim 1, further comprising sending an adjusted routing metric to nodes in a group of nodes, for use by routing functions in the nodes.

20. The method as in claim 1, wherein the telecommunications network comprises a non-traffic engineered telecommunications network.

21. The method as in claim 1, performed on a software defined network controller.

22. A node in a telecommunications network, the node being configured to:
acquire values of one or more parameters relating to traffic flow between a first group of nodes in the network;
use a first reinforcement learning agent that dynamically adjusts a first routing metric used to route traffic through the first group of nodes, based on the values of the one or more parameters, so as to alter the traffic flow through the first group of nodes;
acquire values of one or more parameters relating to traffic flow between a second group of nodes in the network;
use a third reinforcement learning agent to dynamically adjust a third routing metric used to route traffic through the second group of nodes, so as to alter the traffic flow through the second group of nodes, based on the values of the one or more parameters relating to traffic flow between the second group of nodes; and
coordinate the way in which the first and third reinforcement learning agents alter the traffic flow through the first and second groups of nodes respectively.

23. The node in a telecommunications network as in claim 22, wherein the node comprises a software defined network controller.

24. A non-transitory computer-readable storage medium comprising instructions which, when executed on at least one processor, cause the at least one processor to carry out a method in a telecommunications network, the method comprising:
acquiring values of one or more parameters relating to traffic flow between a first group of nodes in the network;
a first reinforcement learning agent dynamically adjusting a first routing metric used to route traffic through the first group of nodes, based on the values of the one or more parameters, so as to alter the traffic flow through the first group of nodes;

acquiring values of one or more parameters relating to traffic flow between a second group of nodes in the network;

using a third reinforcement learning agent to dynamically adjust a third routing metric used to route traffic through the second group of nodes, so as to alter the traffic flow through the second group of nodes, based on the values of the one or more parameters relating to traffic flow between the second group of nodes; and coordinating the way in which the first and third reinforcement learning agents alter the traffic flow through the first and second groups of nodes respectively.

\* \* \* \* \*